(12) United States Patent
Kempf

(10) Patent No.: US 8,839,667 B2
(45) Date of Patent: Sep. 23, 2014

(54) ELECTRONIC UNIT FOR MEASURING THE OPERATION PARAMETERS OF A VEHICLE WHEEL INCLUDING AN ELECTRONIC HOUSING AND AN INFLATION VALVE

(75) Inventor: Christian Kempf, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 79 days.

(21) Appl. No.: 13/519,486

(22) PCT Filed: Oct. 27, 2010

(86) PCT No.: PCT/EP2010/006570
§ 371 (c)(1),
(2), (4) Date: Aug. 16, 2012

(87) PCT Pub. No.: WO2011/079888
PCT Pub. Date: Jul. 7, 2011

(65) Prior Publication Data
US 2012/0312389 A1     Dec. 13, 2012

(30) Foreign Application Priority Data
Dec. 28, 2009   (FR) ...................................... 09 06363

(51) Int. Cl.
*B60C 23/02* (2006.01)
*B60C 23/04* (2006.01)

(52) U.S. Cl.
CPC ......... *B60C 23/0408* (2013.01); *B60C 23/0494* (2013.01)
USPC ....................................................... 73/146.8

(58) Field of Classification Search
None
See application file for complete search history.

(56) References Cited

U.S. PATENT DOCUMENTS

| 4,335,283 A | * | 6/1982 | Migrin ....................... 200/61.25 |
| 6,722,409 B1 | | 4/2004 | Martin |
| 6,885,291 B1 | * | 4/2005 | Pollack et al. ................ 340/445 |
| 7,000,810 B1 | | 2/2006 | Farmer |
| 7,040,155 B1 | | 5/2006 | Lundell et al. |

(Continued)

FOREIGN PATENT DOCUMENTS

| CN | 1781745 A | 6/2006 |
| EP | 1 340 630 A1 | 9/2003 |

(Continued)

OTHER PUBLICATIONS

International Search Report, dated Jan. 21, 2011, from corresponding PCT application.

*Primary Examiner* — Andre Allen
(74) *Attorney, Agent, or Firm* — Young & Thompson

(57) ABSTRACT

An electronic unit includes an inflation valve (2) designed to be attached to a wheel rim (J) and an electronic module (1) assembled with the inflation valve. The inflation valve includes a rigid tube (12) extending in the extension of the valve, on the periphery of which is formed at least one transversal detent (20, 21), and the electronic module is attached to a ring (15) slideably mounted around the rigid tube. A latch plate (22) having a locking tooth (24) for insertion into a transversal detent, is mounted on the electronic module with a capacity to travel between a locking position and an unlocking position, the latch plate being associated with elastic elements designed, in the absence of stresses, to exert a force maintaining the latch plate in its locking position, and, upon an action exerted on these elastic elements, to displace this latch plate to its unlocking position.

28 Claims, 2 Drawing Sheets

(56) References Cited

U.S. PATENT DOCUMENTS

| | | | |
|---|---|---|---|
| 7,694,557 B2 * | 4/2010 | Hettle et al. | 73/146.8 |
| 2002/0000499 A1 | 1/2002 | Aoki et al. | |
| 2004/0084124 A1 | 5/2004 | Martin | |
| 2004/0206169 A1 | 10/2004 | Normann et al. | |
| 2006/0125612 A1 | 6/2006 | Okubo et al. | |
| 2008/0173082 A1 * | 7/2008 | Hettle et al. | 73/146.5 |
| 2008/0202659 A1 | 8/2008 | Hettle et al. | |
| 2009/0007649 A1 | 1/2009 | Kempf et al. | |
| 2010/0192682 A1 | 8/2010 | Gory et al. | |
| 2012/0111102 A1 * | 5/2012 | Tadele et al. | 73/146.5 |

FOREIGN PATENT DOCUMENTS

| | | |
|---|---|---|
| GB | 829 648 A | 1/1957 |
| WO | 03/002360 A1 | 1/2003 |
| WO | 2009/007035 A1 | 1/2009 |

* cited by examiner

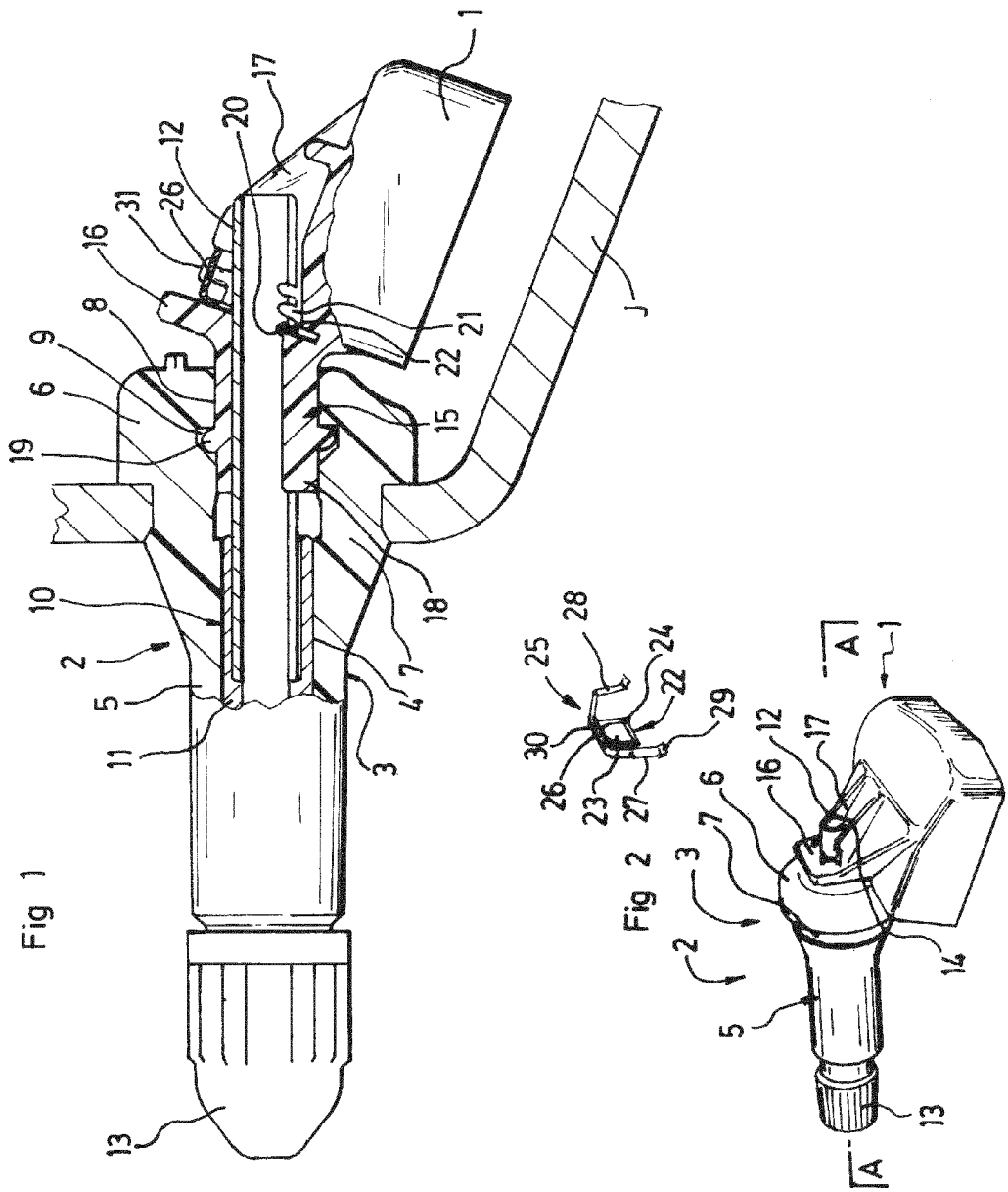

ELECTRONIC UNIT FOR MEASURING THE OPERATION PARAMETERS OF A VEHICLE WHEEL INCLUDING AN ELECTRONIC HOUSING AND AN INFLATION VALVE

FIELD OF THE INVENTION

The invention relates to an electronic unit for measuring operating parameters of a vehicle wheel, comprising an electronic module and an inflation valve.

More and more automobiles include systems for monitoring and/or measuring parameters comprising sensors.

BACKGROUND OF THE INVENTION

Examples of such systems include the tire pressure monitoring systems comprising electronic modules mounted on each of the wheels of the vehicles, dedicated to measuring parameters, such as the pressure and/or temperature of the tires fitted on these wheels, and intended to inform the driver of any abnormal variation of the measured parameter.

One of the current solutions most commonly used to ensure the fastening of the electronic modules on the wheel rims consists in producing electronic units each consisting of an electronic module assembled with an inflation valve enabling said electronic module to be attached to the rim of the wheel.

A solution regarding such electronic units consists in producing specific inflation valves capable of ensuring the transmission of the forces to which the electronic modules are subject. However, this solution is costly because, in addition to the high price of the inflation valves, which are usually entirely metallic, it entails producing auxiliary parts (nuts, seals, etc.) specially designed to guarantee a leak-tight fastening of the inflation valves on the rims.

The document US 2004/0206169 (Beru) describes such an inflation valve having a metallic body fastened by a clamping nut at the orifice of the rim. In this document, the inflation valve does not include any elastic part intended to stretch when fitting the valve in the rim. It is not a "snap-in" valve. This means that this type of valve does not have any rod over which the module has to slide when introducing the valve into the rim orifice. The fastening of the module on the valve head does not need to provide an expansion space for the valve during its fitting. Because of this, the means for attaching the module onto the head of this conventional valve can be produced by a simple elastic clasp.

In order to overcome this drawback, a second solution has consisted in producing inflation valves of the same basic design as the conventional inflation valves of "snap-in" type, modified so as to ensure that the forces to which the electronic modules are subject are taken up.

This solution has notably culminated in the production of an electronic unit as described in the patent application WO 2009/007035 comprising:
an electronic module,
an inflation valve of "snap-in" type, comprising:
  a valve body made of an elastomer material, provided with a longitudinal axial bore and intended to extend through an orifice formed in the rim, said valve body consisting of an elastically deformable trunk and an abutment head against the rim, separated from the trunk by a neck designed to be positioned in a leak-tight manner in the orifice formed in said rim,
  and a hollow tubular core made of a rigid material, housing a shutting mechanism and with dimensions designed to fit into the bore of the valve body and extend on either side in the extension of said valve body, said tubular core consisting of two longitudinal sections arranged relative to one another and in relation to the valve body, so as to allow an elastic deformation of the trunk capable of enabling the inflation valve to be fitted through the orifice of the rim,
and means for attaching the electronic module and the inflation valve comprising:
  a ring attached to the electronic module designed to be slideably mounted around the portion of the tubular core extending in the extension of the abutment head of the valve body, in a position of the electronic module in which the latter extends in the direct extension of the inflation valve,
  and assembling means for fitting a hollow sleeve attached to the ring of the electronic module inside an annular chamber formed in the abutment head of the valve body.

Because of these specific features, and in practice, such an electronic unit has the advantage of guaranteeing a behavior of the inflation valve similar to that of an inflation valve of traditional "snap-in" type.

However, according to this principle, the assembly of the electronic module and of the valve body is done through a link of the fitting type whose resistance is directly linked to the stretch resistance of the elastomer material of the inflation valve. Now, this link has to be dismantleable in order in particular to allow the electronic module to be recovered in the event of damage to the inflation valve. Because of this, it is very difficult to find a resistance trade-off, on the one hand, allowing the two elements to be dismantled, and on the other hand, guaranteeing the strength of the link for high vehicle speeds. For this reason, and in practice, the electronic units comprise an additional removable locking member of the type, as described in the patent application WO 2009/007035, comprising an elastic ring, spring ring of the "lyre" type, "O-clamp" clamping collar, screw clamp, or various types of keyways. However, these additional members require specific tools for their fitting and their removal, and also increase the complexity of the steps for fitting and dismantling the electronic units.

SUMMARY OF THE INVENTION

The present invention aims to overcome these drawbacks, and its main objective is to provide an electronic unit provided with a locking member which guarantees a very high resistance to the tearing away of the electronic module but does not require either additional time or specific fitting/removal tools.

To this end, the invention targets an electronic unit for measuring operating parameters of a vehicle wheel, comprising:
an inflation valve designed to be attached to a wheel rim, comprising:
  a valve body intended to extend through an orifice formed in the rim, said valve body consisting of a trunk and an abutment head against the rim,
  and a hollow rigid tube extending in the extension of the abutment head,
an electronic module attached to a ring designed to be slideably mounted around the rigid tube extending in the extension of the abutment head of the valve body,
and means for attaching the electronic module and the inflation valve, in a position of said electronic module in which the latter extends in the direct extension of said inflation valve.
According to the invention, the means for attaching the electronic module and the inflation valve comprise locking means comprising:

at least one transversal detent formed on the periphery of the rigid tube, and a latch plate associated with the electronic module and having a locking tooth designed to be inserted into a transversal detent of the rigid tube, so as to ensure a translational locking of said electronic module relative to said rigid tube, said latch plate:

being mounted on the electronic module with a ability to travel between a locking position in which the locking tooth is engaged in a detent of the rigid tube, and an unlocking position in which the locking tooth allows a relative translational displacement of the electronic module relative to the rigid tube, being associated with elastic means designed, in the absence of stresses, to exert on this latch plate a force maintaining the latter in its locking position, and, upon an action exerted on these elastic means, to lead to a displacement of this latch plate to its unlocking position.

According to the invention, the locking of the electronic module on the inflation valve is therefore ensured by a latch plate maintained in a natural locking position by elastic means, and designed to switch to an unlocking position by a simple action exerted on said elastic means.

Because of this, the locking means, on the one hand supply a rigid locking of the electronic module on the rigid tube of the inflation valve, thus guaranteeing a very high resistance to the tearing away of said electronic module, and on the other hand do not require either additional time or specific tools for fitting/removal.

Such locking means are designed to be associated with any type of inflation valve provided with a rigid tube extending in the extension of the abutment head of the valve body, but offer a particular advantage when associated with a valve of "snap-in" fitting type, comprising:

a valve body made of an elastomer material, provided with a longitudinal axial bore and consisting of an elastically deformable trunk and an abutment head separated from the trunk by a neck designed to be positioned in a leaktight manner in the orifice formed in the rim, and a hollow tubular core made of a rigid material with dimensions designed to fit into the bore of the valve body and extend on either side in the extension of said valve body, said tubular core consisting of two longitudinal sections arranged relative to one another and in relation to the valve body, so as to allow an elastic deformation of the trunk capable of enabling the inflation valve to be fitted through the orifice of the rim.

In practice, and first of all, the tearing-away forces stressing the electronic module are transmitted, via the ring, to the tubular core of the inflation valve and are therefore withstood by this tubular core and not by the stiffness of the elastomer material of said inflation valve.

Furthermore, in the unlocking position of the latch plate, the electronic module can slide relative to the tubular core so as to allow the relative travels of these two elements when fitting the inflation valve on a rim, without requiring any free space.

Thus, the electronic unit can easily be fitted in a single block on a rim, and easy fitting and dismantling of the electronic module can also be obtained, all these operations requiring only an action exerted on the elastic means.

According to an advantageous embodiment of the invention, the latch plate is designed to be positioned around the rigid tube and consists of a plate pierced with an orifice with a section greater than the diameter of said tube, on the edge of which the locking tooth is formed.

According to this arrangement, when the vehicle is rolling and in the normal position of the electronic module, the centrifugal force is added to the locking force exerted by the elastic means, so that the locking force increases with the speed of rotation of the wheel.

Furthermore, the elastic means advantageously form a shackle designed to be positioned on the electronic module, comprising a main cross member under which the latch plate extends, and two elastically deformable legs designed to bear on the electronic module.

Such elastic means therefore offer a cross member for actuating, for example by finger pressure, said elastic means, and two legs bearing on the electronic module exerting the locking force.

Furthermore, should the electronic module pivot by 180° about the tubular core, the locking force exerted by these two elastic legs tends to oppose the centrifugal force and therefore guarantees that the locking is maintained.

Moreover, the locking means advantageously comprise a plurality of transversal detents for adapting to different rim thicknesses.

BRIEF DESCRIPTION OF THE DRAWINGS

Other features, aims and advantages of the invention will emerge from the following detailed description, with reference to the appended drawings which represent, as nonlimiting examples, two preferred embodiments thereof. In these drawings:

FIG. 1 is a longitudinal cross section through an axial plane A of FIG. 2, representing an electronic unit according to the invention mounted on a wheel rim, FIG. 2 is an exploded perspective view of this electronic unit and of the locking means.

DETAILED DESCRIPTION OF THE INVENTION

Figure 4:
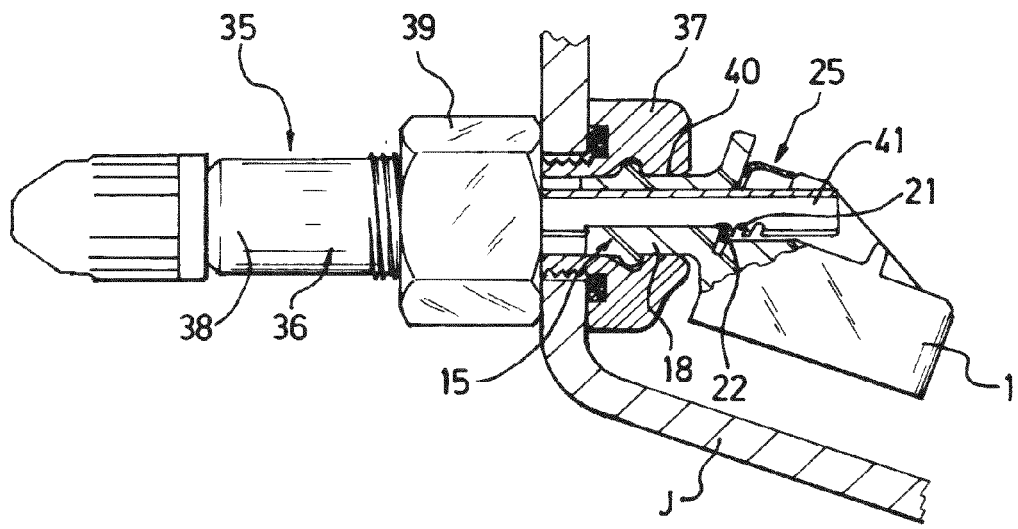
FIG. 4 is a longitudinal cross section representing a variant electronic unit according to the invention mounted on a wheel rim.

The electronic units according to the invention represented by way of example in the figures are intended to be mounted on a wheel of a vehicle in order to measure operating parameters (pressure, temperature, acceleration, etc.) of said wheel, and to transmit the measured data to a central unit (not represented) mounted on the vehicle.

These electronic units consist of an electronic module 1 designed to be mounted inside the jacket of a tire, and an inflation valve, attaching the latter on the rim of the wheel fitted with this tire.

According to FIGS. 1 and 2, and first of all, the inflation valve 2 consists of a "snap-in" inflation valve comprising a valve body 3 made of an elastomer material provided axially with a cylindrical longitudinal bore 4.

Conventionally, this valve body 3 is further subdivided longitudinally, into a trunk 5 offering longitudinal and radial elastic deformation capabilities, and an abutment head 6 separated from the trunk 5 by a neck 7 in the form of an annular groove delimited by two shoulders joining respectively with the trunk 5 and the abutment head 6.

The valve body 3 comprises, lastly, a cylindrical chamber 8 formed in the abutment head 6, in the extension of the bore 4, in which is formed an internal annular groove 9.

The inflation valve 2 also comprises a hollow tubular core 10 made of a rigid material, with dimensions designed to fit into the bore 4 of the valve body 3 and extend on either side in the extension of said valve body. This tubular core 15 consists of two distinct longitudinal sections 11, 12 attached in the extension of one another at the level of the neck 7 of the valve body 3.

The first of these longitudinal sections 11 consists of a hollow cylindrical rod for example made of brass, and notably intended to house the shutting mechanism (not represented) of the inflation valve 2. This cylindrical rod 11 is attached to the valve body 3, inside the bore 4 thereof, and extends, on the one hand, internally, in the trunk 5 to the neck 7, and, externally, in the extension of said trunk. Furthermore, the section of this cylindrical rod 11 located in the extension of the valve body 3 has an external threading designed to enable a protective cap 13 to be screwed on.

The second longitudinal section 12 of the tubular core 10 of the inflation valve 2 consists of a cylindrical tube made of a material such as steel, attached to the end section of the cylindrical rod 11 located in the neck 7, and having a length designed to extend, internally, into the abutment head 6 of the valve body 3 and, externally, in the extension of said abutment head.

This cylindrical tube 12 consists of an elastic pin and has, for this purpose, a longitudinal slot 14. The introduction into the cylindrical rod 11 is thus obtained by tightening this tube 12 on itself in order to enable it to be placed in said rod.

It should be noted that the diameter of the tube 12 is, furthermore, de facto, less than the diameter of the bore 4, so that, upon longitudinal deformation of the trunk 5, this cylindrical tube 12 attached to the cylindrical rod 11 and therefore to the trunk 5, has freedom to move axially (sliding) inside the abutment head 6.

The electronic module of the electronic unit consists of a hollow module 1 intended to house the "electronics" of the electronic unit, associated with a ring 15 attached to said electronic module, designed to be slideably mounted along the section of the cylindrical tube 12 extending in the extension of the abutment head 6 of the valve body 3, in a position of the electronic module 1 in which the latter extends in the direct extension of the inflation valve 2.

This ring 15 includes a plate 16, on the one hand arranged relative to the electronic module 1 so that the latter is inclined by an angle of the order of 10° to 40° relative to the longitudinal axis of the valve body 3, and, on the other hand, whose link with said electronic module is reinforced by two lateral gusset plates such as 17.

Furthermore, this plate 16 is pierced with a circular orifice with a diameter corresponding to the external diameter of the cylindrical tube 12, over the circumference of which extends a cylindrical sleeve 18 with dimensions designed, on the one hand, to slide along the cylindrical tube 12, and, on the other hand, to fit into the cylindrical chamber 8.

This sleeve 18 is also provided, at its end, with an annular external rib 19 with a form designed to fit into the annular groove 9 of the cylindrical chamber 8.

The electronic unit according to the invention also comprises means for locking the electronic module 1 on the portion of the cylindrical tube 12 extending in the extension of the abutment head 6.

These locking means comprise, firstly, a plurality of transversal detents such as 20, 21 formed on the bottom of the cylindrical tube 12, at a distance from the end of said tube dependent on the thickness of the rim J equipped with the electronic unit, designed so that a detent, for example the detent 20, is adjacent to the rear face of the plate 16.

These locking means also comprise a locking member comprising a latch plate 22 designed to be positioned around the tube 12, consisting of a plate pierced with an orifice 23 with a section greater than the diameter of said tube, on the edge of which and under which extends a strip of material 24 forming a locking tooth designed to be inserted into a transversal detent, in the example the detent 20 of the tube 12.

This latch plate 22 is borne by elastic means 25 designed to make it possible to slide it along the rear face of the plate 16 of the electronic module 1. These elastic means consist of a shackle 25 designed to be positioned and bear on the electronic module 1, comprising a main cross member 26 under which the latch plate 22 extends, and two elastically deformable legs 27, 28 designed to bear by a foot-forming return 29 on the electronic module 1.

Figure 3:
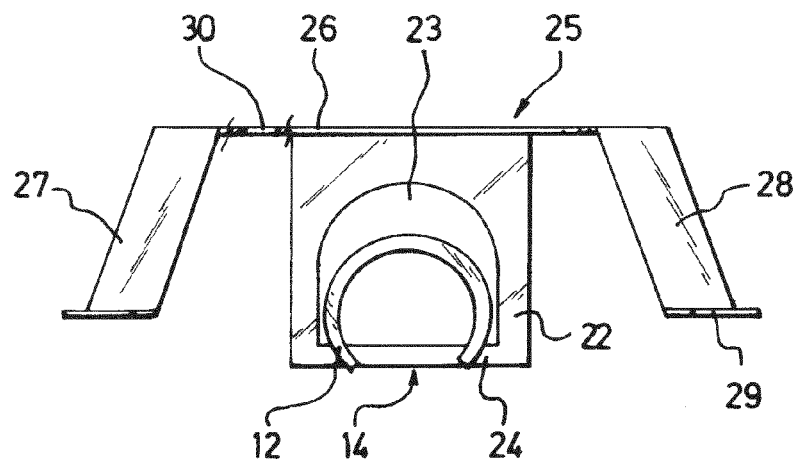
FIG. 3 is an enlarged scale transversal view of the locking means in the locking position on a tubular core of an inflation valve.

This shackle 25 is designed to enable the latch plate 22 to slide between:
  a locking position, represented in FIG. 3, obtained in the absence of stress exerted on the shackle 25, in which the locking tooth 24 is engaged in a detent 20 of the cylindrical tube 12,
  and an unlocking position obtained by a pressure exerted on the cross member 26 of the shackle 25 in which the locking tooth 24 is located outside the detent 20 and allows a relative translational displacement of the electronic module 1 in relation to the cylindrical tube 12.

Furthermore, the cross member 26 of the shackle 25 is pierced with two orifices such as 30, designed to cooperate with two snap-fitting snugs 31 formed on the electronic module 1 so as to keep the shackle 25 assembled on the electronic module 1 before mounting on an inflation valve 2.

The electronic module 1 and the inflation valve 2 of the electronic unit according to the invention can, firstly, be assembled, by introduction of the sleeve 18 into the cylindrical chamber 8, an operation performed by exerting, in addition, a pressure on the cross member 26 of the shackle 25 capable of maintaining the latch plate 22 in its unlocking position.

The locking is then obtained after relaxing the pressure exerted on the cross member 26 of the shackle 25, and makes it possible to lock the electronic module in a position in which it extends in the direct extension, without free space, of the abutment head 6 of the valve body 3, and is inclined by an angle of the order of 10° to 40° relative to the longitudinal axis of said valve body 3.

The electronic unit produced in this way can then be introduced and put in place in an orifice formed in a rim J, on the one hand using the radial and longitudinal deformation capabilities of the trunk 5 of the valve body 3, and on the other hand by maintaining the latch plate 22 in its unlocking position.

During this introduction, the cylindrical tube 12 attached to the cylindrical rod 11 and detached from the abutment head 6, in no way opposes the deformations of the trunk 5. Furthermore, during this introduction, the ring 5 can slide along the section of the cylindrical tube 12 by virtue of the fact that the latch plate 22 is maintained in its unlocking position.

On the other hand, once the electronic unit is mounted on the rim J, the ring 15 is locked on the cylindrical tube 12 after the pressure exerted on the cross member 26 of the shackle 25 is relaxed, so that the tearing-away forces stressing the electronic module 1 are transmitted, via said ring, to the cylindrical tube and therefore withstood by the latter which thus plays a crucial role in rigidifying the inflation valve 2.

As represented in FIG. 4, the invention may also be applied to conventional inflation valves 35, for example consisting of a metallic valve body 36 whose abutment head 37 is blocked against the rim J by means of a nut 39 screwed along a threaded section of the trunk 38. The only imperative lies, as represented in FIG. 4, in the provision, in the abutment head 37 of the valve body 36, of a chamber 40 capable of housing the sleeve 18 of the ring 15, and in the presence of a metallic tube 41 extending in the extension of the abutment head 37.

In an example, an electronic unit for measuring operating parameters of a vehicle wheel, comprises an inflation valve (2) of "snap-in" type, designed to be attached to a wheel rim (J), comprising:
 a valve body (3) made of an elastomer material, provided with a longitudinal axial bore (4) and consisting of an elastically deformable trunk (5) and an abutment head (6) separated from the trunk (5) by a neck (7) designed to be positioned in a leak-tight manner in the orifice formed in the rim (J),
 and a hollow tubular core (10) made of a rigid material with dimensions suitable for insertion into the bore (4) of the valve body (3) and for extending on either side in the extension of said valve body, said rigid tubular core consisting of two longitudinal sections (11, 12) arranged relative to one another and in relation to the valve body (3), so as to allow an elastic deformation of the trunk (5) capable of enabling the inflation valve (2) to be fitted through the orifice of the rim (J),
an electronic module (1) attached to a ring (15) designed to be slideably mounted around the rigid tubular core (12) extending in the extension of the abutment head (6) of the valve body (3),
and means (9, 19) for attaching the electronic module (1) and the inflation valve (2), in a position of said electronic module in which the latter extends in the direct extension of said inflation valve, said electronic unit being characterized in that the means for attaching the electronic module (1) and the inflation valve (2) comprise locking means comprising:
 at least one transversal detent (20, 21) formed on the periphery of the rigid tubular core (12),
 and a latch plate (22) associated with the electronic module (1) and having a locking tooth (24) designed to be inserted into a transversal detent (20, 21) of the rigid tubular core (12), so as to ensure a translational locking of said electronic module relative to the rigid tubular core, said latch plate:
being mounted on the electronic module (1) with a ability to travel between a locking position in which the locking tooth (24) is engaged in a detent (20, 21) of the rigid tubular core (12), and an unlocking position in which the locking tooth (24) allows a relative translational displacement of the electronic module (1) relative to the rigid tubular core (12),
being associated with elastic means (25) designed, in the absence of stresses, to exert on this latch plate (22) a force maintaining the latter in its locking position, and, upon an action exerted on these elastic means (25), to lead to a displacement of this latch plate (22) to its unlocking position, and being designed to be positioned around the rigid tubular core (12) and consists of a plate (22) pierced with an orifice (23) with a section greater than the diameter of the tubular core, on the edge of which the locking tooth (24) is formed.

In another example, the electronic unit is characterized in that the elastic means form a shackle (25) designed to be positioned on the electronic module (1), comprising a main cross member (26) under which the latch plate extends, and two elastically deformable legs (27, 28) designed to bear on the electronic module (1).

In another example, the electronic unit is characterized in that the locking means comprise a plurality of transversal detents (20, 21) for adapting to different rim (J) thicknesses.

The invention claimed is:

1. A valve stem assembly, comprising:
 a valve body being constructed of a flexible material, the valve body defining a longitudinal bore extending therethrough; and
 a rigid core disposed within and extending entirely through the bore, the core having at least one detent formed along a periphery of the core, the detent being configured to receive a locking member positioned outside of the bore and around the rigid core and including a locking insert configured to be inserted into the detent, the locking member being coupled to an electronic module that monitors a condition of a tire,
 wherein moving the locking insert of the locking member into the detent ensures at least a partial locking between the core to the electronic module.

2. The valve stem assembly of claim 1 wherein the core is hollow.

3. The valve stem assembly of claim 1 wherein the core is a hollow tubular structure comprising a first longitudinal section and a second longitudinal section.

4. The valve stem assembly of claim 3 wherein the first longitudinal section comprises a shutting mechanism of an inflation valve.

5. The valve stem assembly of claim 3 wherein the first longitudinal section comprises a cylindrical rod, and wherein the second longitudinal section comprises a substantially cylindrical tube that fits into the cylindrical rod.

6. The valve stem assembly of claim 1 wherein the partial locking is effective to incline the electronic module with respect to a longitudinal axis of the core at an angle from approximately 10 degrees to approximately 40 degrees.

7. The valve stem assembly of claim 1 wherein the valve body is configured to be engaged to a protective cap.

8. The valve stem assembly of claim 1 wherein the valve body comprises an abutment head, a trunk, and a neck, the abutment head being separated from the trunk by the neck.

9. A valve stem assembly comprising:
 a valve body being constructed of a flexible material, the valve body defining a longitudinal bore extending therethrough; and
 a hollow core disposed within the valve body, the hollow core being constructed of a rigid material and having an end portion extending through the bore, the hollow core having at least one detent formed along a periphery of the end portion of the core, the detent being configured to receive a locking member positioned outside of the bore and around the core and including a locking insert configured to be inserted into the detent, the locking member being coupled to an electronic module that monitors a condition of a tire,
 wherein moving the locking insert of the locking member into the detent ensures at least a partial locking between the hollow core to the electronic module, and
 the partial locking is effective to incline the electronic module with respect to a longitudinal axis of the hollow core at a non-right angle.

10. The valve stem assembly of claim 9 wherein the non-right angle is in the range of approximately 10 degrees to approximately 40 degrees.

11. The valve stem assembly of claim 9 wherein the core is a tubular structure comprising a first longitudinal section and a second longitudinal section.

12. The valve stem assembly of claim 11 wherein the first longitudinal section comprises a shutting mechanism of an inflation valve.

13. The valve stem assembly of claim 11 wherein the first longitudinal section comprise a cylindrical rod, and wherein the second longitudinal section comprises a substantially cylindrical tube that fits into the cylindrical rod.

14. The valve stem assembly of claim 9 wherein the valve body is configured to be engaged to a protective cap.

15. The valve stem assembly of claim 9 wherein the valve body comprises an abutment head, a trunk, and a neck, the abutment head being separated from the trunk by the neck.

16. A tire pressure measurement system comprising:
a valve body being constructed of a flexible material, the valve body having a longitudinal bore extending therethrough;
a core disposed within and extending through the bore, the core having at least one detent formed along a periphery of the core;
an electronic module configured to measure tire pressure, the electronic module communicating with the core; and
a locking member positioned outside of the bore and around the core and including a locking insert configured to be inserted into the detent, the locking member being coupled to the electronic module, the detent being configured to receive the locking insert of the locking member,
wherein moving the locking insert of the locking member into the detent ensures at least a partial locking between the hollow core to the electronic module.

17. The system of claim 16 wherein the locking member is configured to move between a locking position and an unlocking position.

18. The system of claim 17 wherein the locking position is obtained in the absence of stress on portions of the locking member.

19. The system of claim 17 wherein the unlocking position is obtained in the presence of stress on portions of the locking member.

20. The system of claim 16 wherein the locking member comprises a tab-like member.

21. The system of claim 20 wherein the tab-like member comprises a locking tooth.

22. The system of claim 16 wherein the core is hollow.

23. The system of claim 16 wherein the core is a hollow tubular structure comprising a first longitudinal section and a second longitudinal section.

24. The system of claim 23 wherein the first longitudinal section comprises a shutting mechanism of an inflation valve.

25. The system of claim 23 wherein the first longitudinal section comprises a cylindrical rod, and wherein the second longitudinal section comprises a substantially cylindrical tube that fits into the cylindrical rod.

26. The system of claim 16 wherein the partial locking is effective to incline the electronic module with respect to a longitudinal axis of the core at an angle from approximately 10 degrees to approximately 40 degrees.

27. The system of claim 16 wherein the valve body is configured to be engaged to a protective cap.

28. The system of claim 16 wherein the valve body comprises an abutment head, a trunk, and a neck, the abutment head being separated from the trunk by the neck.

* * * * *